Jan. 9, 1940.   M. KLEIN   2,186,872
STEAM GAUGE
Original Filed Nov. 14, 1932
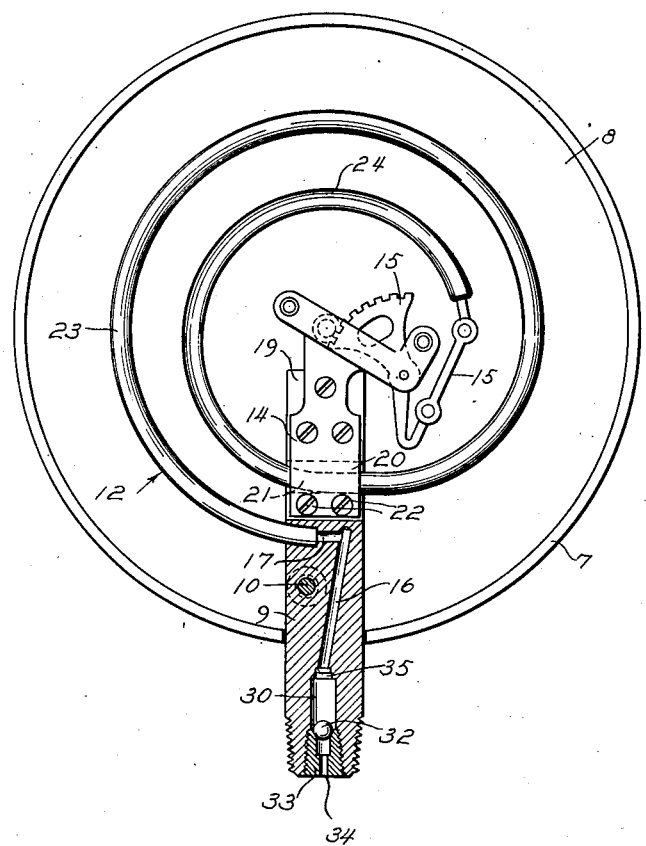
Inventor
Maximilian Klein
By Strauch & Hoffman
Attorney Patented Jan. 9, 1940

2,186,872

UNITED STATES PATENT OFFICE 2,186,872

STEAM GAUGE

Maximilian Klein, Sellersville, Pa., assignor to United States Gauge Company, Sellersville, Pa., a corporation of Pennsylvania Original application November 14, 1932, Serial No. 642,650. Divided and this application March 22, 1938, Serial No. 197,461

4 Claims. (Cl. 73—109)

This invention relates to pressure gauges of the type wherein it is necessary or desirable to employ means for preventing the internal parts, particularly the materials of the responsive element and of any fusible joints, from being subjected to excessively high temperatures.

This application is a division of my co-pending application Serial No. 642,650 filed November 14, 1932.

The present invention is chiefly concerned with improvements in concealed siphon structures and arrangements of the type wherein the internal siphon is mounted within the casing and carried by the same member that supports the pressure responsive element so that the siphon, Bourdon tube and movement may be mounted as an improved unit within a gauge casing. For a more detailed discussion of the desirability of such a structure reference may be had to my above mentioned co-pending application.

The object of this invention is to provide a combination one-piece tube properly mounted to function simultaneously as a Bourdon tube and siphon element.

A further object of this invention is to fasten the one-piece tube to the supporting member in such a manner that the siphon portion will be rigidly secured in place while the Bourdon tube portion will be free to flex in usual manner.

The above and additional objects will fully appear from a study of the following detailed description and its appended claims, when taken in conjunction with the accompanying drawing, wherein:

The figure shows an elevation of a preferred embodiment of this invention by way of illustration.

With continued reference to the drawing, wherein like characters are employed to designate like parts, the instrument comprises a casing 7 having an open face and a back 8; a post or socket 9, detachably fastened to the back 8 by a screw 10, and having its lower end projecting freely through the cylindrical casing wall for connection with a fluid source; a combined siphon tube and Bourdon tube indicated in general by numeral 12; a frame work 14; and a movement, indicated generally at 15.

The lower end of the socket is axially drilled to form a passage 16 which intersects a short transverse passage 17. The latter is in communication with one end of the tube 12, which is fixed in the socket by brazing. The higher temperatures of a brazing operation are permissible for this purpose since a variation in the characterics of the tube material at this point has no effect on the accuracy and life of the gauge proper. Brazed joints are desirable because they will not fuse under the temperature of the steam.

From the foregoing it will be seen that pressures are transmitted from the socket to tube 12 and that all of the parts are supported as a unit on the socket. The movement comprises a conventional link, segment and pinion assembly associated with the framework 14, the latter being rigidly mounted on the socket by rivets, screws or the like. The common support ensures accurate relationship of parts, and reduces the material and assembling costs to a minimum. It further permits the entire operating structure, including the pointer and dial (not shown) to be inserted into and withdrawn from the casing as a unit.

Tube 12 may be formed, if desired, by integrally connecting the aligned ends of a Bourdon tube and a siphon tube, or by integrally forming both of said elements out of one continuous piece of tubing as illustrated in the drawing. In either event the resulting continuous tubing 12 must be clamped in fixed position at a proper point. For example, post 9 is recessed at 19 and is transversely slotted at 20 to partially receive a portion 21 of tubing 12, and the movement framework 14 is extended downwardly over said portion 21 and forced thereagainst by means of screws 22 which pass through the extension and into the post. In this manner tube 12 is divided into a siphon tube 23 and a Bourdon tube 24.

The siphon tube 23 may be given any other suitable shape or form, such as for example, the well known pigtail form or a plurality of convolutions as illustrated in my co-pending application referred to above. However, it preferably consists simply of a single convolution having its free end set into the post 9 in communication with the fluid passage 17. Although this form of trap is not quite as effective as those of the other modified forms suggested, still it functions satisfactorily under most conditions since the length of siphon tube 23, when combined with that of Bourdon tube 24, is such as to provide a long column of air which, when the instrument is placed in use, will not ordinarily be so greatly compressed as to permit hot condensate to gain access to Bourdon tube 24. Moreover, a body of condensate in the siphon portion 23 of the tube does no appreciable harm, especially if the solder of the joints has a relatively high point of fusibility, or if a single piece of tubing is used. The feature of integrally joining the siphon and Bourdon tube ends is, therefore, of particularly great advantage when the siphon takes the shape illustrated in the drawing.

As to protection of the Bourdon tube portion 24, it is chiefly the flexible upper and vertical portions of the Bourdon element which require protection against high temperature. If the pressure of the fluid is not too great, the Bourdon tube may even be almost completely filled with condensate without damage. The chief requisite is that the siphon must keep live steam and steam temperatures away from the Bourdon portion 24.

A hotter condensate may form and be partially trapped in the brazed end of the tube 12, and this trapping action may be assisted by the provision of a check valve assembly in the socket 9. This assembly comprises a bore 30 containing a ball valve 32 which is held in place by screw plug 33 having an inlet hole 34. There is a slight clearance between the valve and the bore, and the valve does not tightly seal the seat on which it normally rests, so that the passage is restricted without preventing the transmission of all pressure variations to the Bourdon tube.

The ball 32 is designed to rise into full sealing engagement with a seat 35 under certain abnormal conditions, such as sudden violent increases in pressure. Also, should the tubing burst or any of the connections develop leaks, the ball will seat itself and thus protect the movement against immersion in hot vapor.

When the gauge is connected to a steam line the contained air will be compressed in tube 12 and hot condensate will collect in the trap formed by the trap portion 23. A certain amount of condensate may accumulate in the trap formed by trap portion 23, however, due to the relatively great length of this portion of tube 12, this condensate will be relatively cool and will not damage the Bourdon tube portion 24.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a pressure gauge, a Bourdon spring tube section; a supporting structure anchoring one end of said tube section; and an elongated rigid siphon tube section of at least one loop formation for transmitting pressures to said Bourdon tube section, said siphon tube section having a volumetric capacity at least as great as that of the Bourdon tube section and constituting an integral continuation thereof to form a single continuous tube, and being rigidly mounted upon said supporting structure.

2. A pressure gauge comprising a post having a bore formed therein, means forming a coil of tubular structure having a continuous passage therein, said coil having a portion intermediate its length supported upon and directly connected to said post and secured against displacement with respect thereto and having one of its end portions communicating with said bore, and having its opposite end closed and movably responsive to pressure in said passage.

3. In a pressure gauge, a tube section having one end closed and its other end open to form a Bourdon spring; a socket or post designed for connection with a fluid source and having said open end of the Bourdon spring supported thereon; said socket further having a channel formed in one face thereof; and a relatively rigid elongated trap tube section for transmitting pressures of said fluid to said Bourdon spring while protecting the latter against any excessive temperatures, said trap tube section having one end secured to said socket in communication with the fluid source and its other end directly and integrally joined to said open end of the Bourdon spring tube in alignment therewith, and said tube section further having a portion fitted laterally into said socket channel; and means for holding said portion firmly in said channel.

4. A pressure gauge comprising a post having a passage extending from one end thereof and opening toward one side of the post, a combined internal syphon and pressure responsive element in the form of a single tube having one end connected to said post so that the passage of the tube communicates with the passage in the side of the post, said tube having a syphon portion in the form of a substantially complete single convolution of a relatively flat helical coil beginning at said named end and extending above the post and rigidly secured at the other end of said convolution to said post at a point between said passage and the other end of said post, the remainder of said tube being curved helically within said convolution on a substantially smaller radius than said convolution and terminating in a closed end free of attachment to said post so as to be movably responsive to pressure in said passage and coil.

MAXIMILIAN KLEIN.

CERTIFICATE OF CORRECTION.

Patent No. 2,186,872. January 9, 1940.

MAXIMILIAN KLEIN.

It is hereby certified that error appears in the printed specification of the above numbered patent requiring correction as follows: Page 2, second column, line 33, claim 3, before the word "tube" second occurrence, insert trap; and that the said Letters Patent should be read with this correction therein that the same may conform to the record of the case in the Patent Office.

Signed and sealed this 12th day of March, A. D. 1940.

Henry Van Arsdale,
Acting Commissioner of Patents.

(Seal)